Sept. 14, 1965 H. R. BARKEMEYER ETAL 3,206,406

CRITICAL COOLING RATE IN VAPOR DEPOSITION PROCESS TO FORM BLADELIKE SEMICONDUCTOR COMPOUND CRYSTALS

Filed Oct. 31, 1962

INVENTORS
HENRY R. BARKEMEYER
WILLIAM J. MC ALEER
PETER I. POLLAK
BY Walter Katz
ATTORNEY 3,206,406

CRITICAL COOLING RATE IN VAPOR DEPOSITION PROCESS TO FORM BLADELIKE SEMICONDUCTOR COMPOUND CRYSTALS

Henry R. Barkemeyer, North Plainfield, William J. McAleer, Madison Township, and Peter I. Pollak, Scotch Plains, N.J., assignors to Merck & Co., Inc., Rahway, N.J., a corporation of New Jersey Filed Oct. 31, 1962, Ser. No. 236,761
11 Claims. (Cl. 252—62.3)

This application is a continuation-in-part of applications Serial Nos. 27,883, filed May 9, 1960, No. 65,401, filed October 27, 1960 and No. 140,164 filed September 18, 1961. Each of these applications is abandoned.

This invention relates to a novel form of semiconductor material and, more particularly, to a novel crystal form of semiconductor material useful in the fabrication of semiconductor devices.

While the term semiconductor material traditionally has denoted certain elements of the Group IV series in the periodic system, such as germanium, silicon, and silicon carbide, it is presently known in the art that compounds of the GROUP III–V elements, such as gallium arsenide, indium phosphide, and the like, also exhibit semiconductive characteristics in the same manner as germanium and silicon. Examples of such compounds and details with respect to their semiconductive characteristics are illustrated in U.S.P. No. 2,798,989, issued July 9, 1957 to Welker. In addition to the compounds formed of two elements, one from Group III and one from group V, it is known that semiconductor compounds of similar nature may be formed from polyelemental compounds of the general formula $$(A_xB_{1-x})^{III}(C_yD_{1-y})^V$$

where A and B are different elements but both of Group III, i.e., boron, aluminum, gallium, indium or thallium, and C and D are different elements but both of Group V, i.e., nitrogen, phosphorus, arsenic, antimony or bismuth, and where the subscripts $x$ and $y$ denote atom proportions whose values can change from zero to unity, inclusive. Examples of such compounds known to exhibit semiconductive properties are $Ga_2AsP$, $GaInSb_2$, AlInPas, $Ga_{0.4}In_{0.6}P$. Further examples are discussed in U.S.P. No. 2,858,275 issued October 28, 1958 to Folberth.

It is appreciated that the number of compounds which may be formed from the Group III–V elements is substantial, which, theoretically at least, enables one to obtain a suitable combination of characteristics for substantially any semiconductor application desired. For example, compounds may be formed which will exhibit semiconducting characteristics intermediate between silicon and germanium so far as energy gap, carrier number and carrier mobilities are concerned.

The techniques for preparing elemental semiconductor bodies, such as germanium, silicon and silicon carbide have been well established in the art. Typically, the preparation of crystals of these elements is carried out by solidification from the molten state. The compounds of the Group III–V elements also are commonly fabricated by forming a melt of the specific Group III element and Group V elements in approximate stoichiometric quantities, or, as is more commonly expressed, in equal atomic proportions of each element, i.e., an atomic proportion of 0.5 each. Normally, the material is formed in a crucible or boat, usually of graphite or quartz, and crystals of the compound are grown. The crystals are then cut into wafers from which semiconductor devices may be fabricated.

As will be appreciated by the art, it is preferable that crystal semiconductor bodies thus prepared have a substantial area with a regular shape so that many semiconducting devices may be fabricated from one piece without loss or waste of material, each of the devices thereby also having the same size and substantially identical physical properties. These attributes are most readily realized in a crystal which has a large and regular surface area. Furthermore, as the art will appreciate, it is also desirable that the crystal be relatively thin in order to eliminate additional cutting operations which would be required with thick crystals. Crystal semiconductor materials presently available to the art are notedly deficient in one or more of these characteristics.

Accordingly, it is an object of the present invention to provide a novel form of crystal semiconductor material.

It is another object of this invention to provide a novel form of crystal semiconductor body, such as germanium, silicon, silicon carbide and compounds of Group III–V elements, the crystal being elongated with appreciable area and substantially planar upper and lower surfaces.

Another object of the present invention is to provide a method of preparing thin, elongated, large-area crystals of semiconductor materials including germanium, silicon, silicon carbide and compounds of Group III–V elements doped with conductivity determining impurities.

It is a further object of the instant invention to provide thin, elongated, large-area crystals of semiconductor materials including germanium, silicon, silicon carbide, and compounds of Group III–V elements, the crystals having substantially planar upper and lower surfaces.

Yet another object of the instant invention is to provide a method of making such semiconductor crystals by charging a reaction chamber with reactants including the element or elements of the specific semiconductor material to be formed and a transport agent for the material; heating the reactants to a predetermined temperature adequate to transform said reactants to the vapor phase within the chamber; and effecting a supersaturation of said vapors at a predetermined nucleation temperature to effect formation of the novel crystal blades of the semiconductor material within the reaction chamber.

Among the other objects of this invention is to provide a method of preparing such crystal semiconductor materials, which method includes charging the reaction chamber with reactants of the element or elements of the specific semiconductor material to be formed and a halogen transport agent, for said material, at a predetermined concentration; heating said reactants to a predetermined temperature adequate to transform said reactants to the vapor phase within the chamber and cooling the reactant vapors at a predetermined rate to a predetermined nucleation temperature in accordance with said concentration of said reactants to effect formation of the novel crystals of the semiconductor material within the reaction chamber.

A more specific object of this invention is to provide a method of preparing thin, elongated, large-area crystals of semiconductor materials including germanium and silicon and a compound of a Group III–V element, the cyrstals having substantially planar upper and lower surfaces, which method includes the step of cooling a vapor form of the semiconductor material at a predetermined rate to effect formation of the novel crystals of the semiconductor material within the reaction chamber.

Still another object of the present invention is to provide a method of making the crystal semiconductor bodies as described above, which method includes charging a reaction chamber with reactants of a halogen and the element or elements of the specific semiconductor material to be formed, removing from said chamber materials other than said reactants, heating said reactants to a temperature adequate to transform said reactants to the vapor phase within the chamber, and cooling the reactant vapors at a predetermined rate to effect formation of the novel crystals of the semiconductor material within the reaction chamber.

These and other objects of this invention will become apparent when consideration is given to the hereinafter detailed description of the invention taken in conjunction with the accompanying drawings, wherein.

Figure 1:
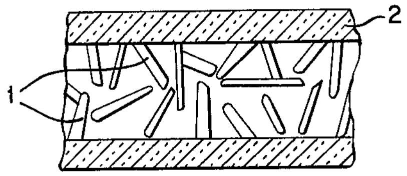
FIGURE 1 is an illustration of the novel semiconductor crystal of the present invention.

In accordance with the present invention there is provided a novel form of semiconductor material including germanium, silicon, silicon carbide, and Group III–V compounds of the general formula $$(A_xB_{1-x})^{III}(C_yD_{1-y})^{V}$$

where A and B are different elements but both of Group III, i.e., boron, aluminum, gallium, indium or thallium, and C and D are different elements but both of Group V, i.e., nitrogen, phosphorus, arsenic, antimony or bismuth; where subscripts x and y denote atom proportions whose values can change from zero to unity, inclusive. It is possible to provide these novel crystals, hereinafter referred to as crystal blades, of germanium, silicon, silicon carbide, and the Group III–V compounds if, as will be described in detail hereinafter, controlled conditions of supersaturation of the reactants within the reaction chamber are employed. These blades are crystals of the semiconductor material in a form having a substantially regular shape with an appreciable area and having substantially planar upper and lower surfaces. These crystals may be further described as being decidedly elongated and rather thin with a substantially rectangular surface area of large dimensions. To one skilled in the art of semiconductor material and, in particular, to one involved in the fabrication of economical devices therefrom, it is evident that the crystal blades of the present invention may be diced and semiconductor devices fabricated therefrom by known techniques, with a significant reduction in the cost of production of such devices.

Yet another feature of the present invention is the provision of such semiconductor blades appropriately doped with conductivity-determining impurities.

As another feature of the present invention, there is provided a method of forming the crystal blades which includes charging a reaction chamber with the element or elements of the specific compound to be formed and a transport agent therefor, suitably a halogen, and preferably in appropriate atomic proportions thereof, heating the reactants in a reaction chamber to a predetermined temperature adequate to provide a volatile form of the reactants in the reaction chamber; and thereafter effecting a supersaturation of said vapors at a nucleation temperature, thereby to form said crystal blades of semiconductor materials within the reaction chamber.

Still another feature of the invention is a method of forming such crystal blades by charging a reaction chamber with a halogen transport agent and the element or elements of the specific compound to be formed, in appropriate atomic proportions thereof and a predetermined concentration; heating the reactants in a reaction chamber to a first predetermined temperature adequate to provide a volatile form of the reactants in the reaction chamber; and thereafter cooling at least a portion of the reaction chamber at a predetermined rate to a second predetermined nucleation temperature in accordance with said concentration of reactants in the reaction chamber, thereby to form crystal blades of said semiconductor materials within the cooled reaction chamber.

As still another feature of the present invention there is provided a method of forming the crystal blades which includes charging a reaction chamber with a halogen and the element or elements of the specific compound to be formed, and preferably, appropriate atomic proportions thereof, removing from the chamber materials other than those charged therein, heating the reactants in the reaction chamber to a temperature adequate to provide a volatile form of the reactants in the reaction chamber, and thereafter cooling at least a portion of the reaction chamber at a predetermined rate where the slope of the curve of temperature in degrees Kelvin plotted against time in minutes at the point which crystal blades form within the reaction chamber is within the range of about minus 1 to minus 70, preferably from minus 15 to minus 50, thereby to form crystal blades of semiconductor materials within the cooled reaction chamber.

Specifically, an element of Group IV, such as silicon, or silicon and carbon in the case of silicon carbide, or an element of Group III, such as gallium, and an element of Group V, such as arsenic, is placed in a reaction chamber, such as a sealed quartz tube, together with a transport agent, such as iodine crystals, and heated to a predetermined temperature to form volatile compounds of silicon and iodine or gallium, arsenic and iodine. Thereafter there is effected a supersaturation of the vapors at a nucleation temperature to form the novel crystal blades of the present invention. Preferably, supersaturation is effected by cooling at least a portion of the reaction chamber at a predetermined rate to the nucleation temperature. Crystal blades of elemental silicon, silicon carbide or a Group III–V compound, in this case gallium arsenide, are thus formed in the tube.

As described, the transport agent used herein serves to maintain the metallic constituent of the semiconductor material in the vapor phase wherefrom it can disproportionate at the nucleation temperature in the form of blade-like crystals. While a preferred transport agent for use in such a process is a halogen, preferably iodine, bromine or chlorine, other transport agents which will provide a vapor species of the semiconductor material capable of disproportionation may be used as well. Such transport agents will, of course, be chemically similar to halogens, for example, oxygen and sulphur.

According to a more preferred embodiment of the present invention, the entire reaction chamber may be cooled at a predetermined rate to form the crystal blades desired. According to a second embodiment, a portion only of the reaction chamber is cooled at the aforementioned predetermined rate to produce similar results.

Referring now to FIGURE 1, there is shown schematically the crystal blades 1 of the present invention as they form in the reaction chamber 2, the latter to be described in detail hereinafter. Most of the crystals are observed to be disposed generally inward from the interior surface of the reaction chamber 2. The more perfect blades, as illustrated in detail in FIGURE 2, exhibit an elongated, thin, regular form and shape with a substantial surface area. The crystals obtained in accordance with this invention have lengths ranging from about 10 mm. to 10 cm., with widths ranging from about 3 mm. to 10 mm., respectively, with thicknesses ranging from about 0.001 mm. to about 0.2 mm., all determined from measurements of variously randomly-selected specimens obtained from various runs. A typical crystal blade, for example, exhibits a length of 37 mm., a width of 5 mm. and a thickness of 0.02 mm. These crystals have a length and width adequate to enable electrical contacts to be attached to the surfaces of the crystal, have substantially planar upper and lower surfaces, and have a thickness adequate to enable the formation therein of a plurality of layers of differing electrical conductivities and a transition region therebetween.

The novel crystals of the present invention may be characterized as "single" crystals in contrast to polycrystals; however, crystallographic examination of the blades indicates that they are, in fact, twin crystals, i.e., two single crystals turned 180° from each other and joined by a twinning plane. Generally, it is found that the crystal form of the present invention has [111] faces and a <211> long axis with the twin crystals occupying substantially the entire thickness of the crystal. The twin plane is observed to be coherent with the [111] faces.

Figure 3:
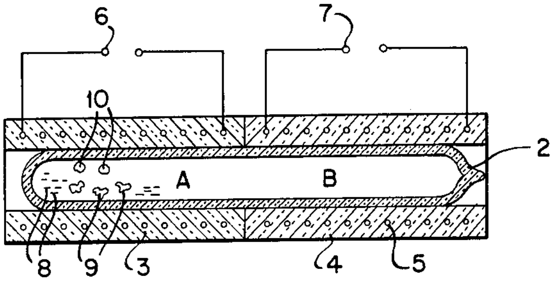
FIGURE 3 is a schematic illustration of an apparatus suitable for carrying out the method of this invention.

In FIGURE 3 there is presented a multi-purpose apparatus which may be employed for preparing the novel semiconductor blades of this invention in accordance with a preferred practice. The reaction chamber 2 is formed of a suitable material, such as quartz, and is preferably in the form of a sealed tube. Surrounding the tube are several furnaces 3 and 4 which may be used, if desired, to heat different zones of the reaction chamber designated A and B. The furnaces may conveniently comprise an electrical insulating ceramic shell such as alundum in which are embedded resistance heating wires 5 spirally wound, all forming a cylindrical heating device within which the reaction chamber may be positioned. The resistance heating wire of each furnace may be connected to a source of electrical energy (not shown) through each furnace's individual terminal wires 6 and 7.

For purposes of clarity only and not as a limitation thereof, the following description of the process of the present invention will be described with particular reference to the formation of crystal blades of Group III–V compounds.

Into the reaction chamber 2 are introduced a halogen illustrated as crystals 8, which may be, and in the preferred embodiments of this invention are, crystals of iodine, together with a Group III element such as gallium, designated 9, and a Group V element such as arsenic, designated 10. It will be appreciated that the Group III element and the Group V element may be in the form of a compound of these elements, in any particular form available, or reactants may be charged in the form of halides of the Group III and V elements.

As heretofore indicated, the relative amounts of Group III and Group V elements charged to the reaction chamber are, preferably, approximately equal atomic proportions of each, since the crystals finally formed will be composed of the elements in substantially equal atomic proportions. It has been observed, however, that the finally formed and desired crystals do not include the entire amount of Group III and Group V elements charged to the reaction chamber. Experimentation has indicated that there is deposition in the chamber in the form of a halide and/or free element. In any particular system, then, it is theoretically possible to calculate the amount of halide or free element of any particular material which deposits as such after the reaction occurs, and eliminate that amount of that element from the initial charge, if desired. It is, of course, also possible to vary the relative amounts of the Group III–V elements otherwise if a sacrifice in yield is not undesirable.

As indicated in the generic formula given for the Group III–V compounds which may be formed in accordance with this invention, the Group III element component of the compound is in equal atomic proportion to the Group V component of the compound. It will be appreciated that within the Group III component more than one element of this group may be employed, and the relative proportions of each of the Group III elements may be varied from zero to unity atom proportion of each. This is also true with respect to the Group V component of the compound.

In carrying out the preferred method of this invention, after the materials are charged to reaction chamber 11, other materials present therein such as air, water vapor and the like, are removed from the chamber. The chamber is evacuated by drawing a vacuum of approximately $10^{-4}$ mm. of Hg on the chamber and then sealing the capillary through which the vacuum was drawn. If the halogen used is in the form of a gas, it is possible, of course, to use the gas charged as a flushant to remove unwanted vapors from the chamber.

After the reaction chamber has been sealed with only the reactants, i.e., the Group III and Group V elements and the halogen, contained therein, it is positioned within the furnace as illustrated in FIGURE 3, and a source of electrical energy is connected to each of terminals 6 and 7, to heat the reaction chamber throughout its length by means of the resistance heating wires 5 embedded in the furnace and overlying the reaction chamber. Heating is continued until vaporization of the halogen and the Group III and Group V elements is effected, thereby resulting in a homogeneous vapor phase within the reaction chamber 2. Such a temperature is designated as $T_V$ on the curve illustrated in FIGURE 4. The reactants should be maintained in the vapor state for a period of time in order to insure further homogeneity of the vapor phase within the reaction chamber.

At this point in the procedure, according to the preferred practice of the method of the present invention, the entire reaction chamber is cooled at a predetermined rate to form the crystal blades described heretofore. Alternatively, a portion of the reaction chamber, for example, section A or B, may be cooled at the same predetermined rate. To accomplish the latter, the amount of electrical energy being fed to furnace 4 only, for example, may be decreased to effect cooling of section B of the reaction chamber relative to section A.

Figure 2:
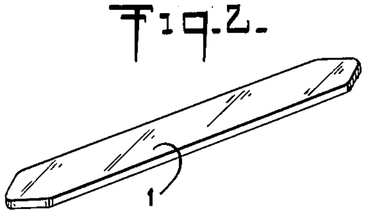
FIGURE 2 is a more detailed illustration of one of the crystals formed in accordance with this invention.

It has been found that the cooling rate should be maintained within prescribed limitations in order to form crystal blades of the Group III–V compound. If the tube is very rapidly cooled with respect to the rate which produces the crystal blades, the compound will form in the reaction chamber in a branched structure resembling typical dendritic growth which may be described as a whisker-like form of the compound. If, on the other hand, extremely slow cooling is effected, the Group III–V compound will form a polycrystalline chunk or clinker or in some instances as a plurality of tiny, generally square-shaped plates. If the cooling rate is adjusted in accordance with this invention the Group III–V compound will form elongated crystal blades having appreciable area as illustrated in FIGURES 1 and 2.

Substantial experimentation has indicated that when the temperature in degrees Kelvin of that section of the chamber which is being cooled is plotted against the time for cooling in minutes, the slope of the curve at the point $T_F$, which is the temperature at which the Group III–V blade forms, is within the range of approximately minus 1 to minus 70, preferably minus 15 to minus 50, with ideal results obtained for the more interesting compounds when the slope is approximately minus 15.

Figure 4:
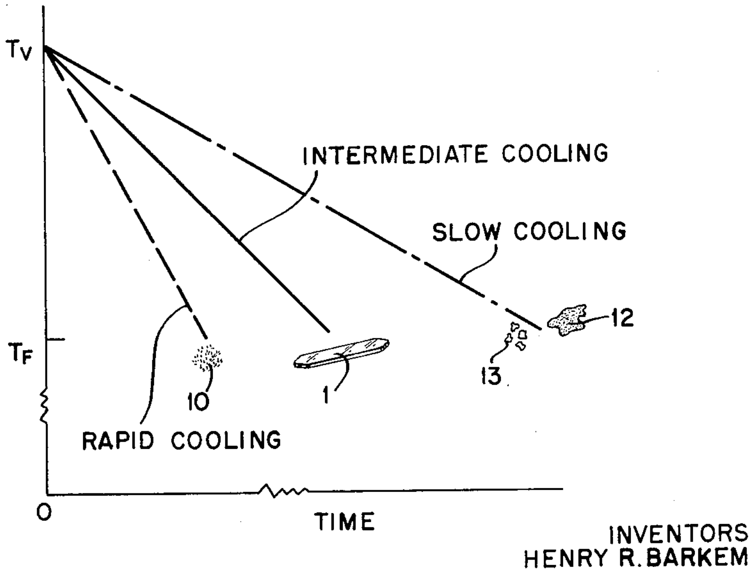
FIGURE 4 is a graph illustrating curves representing time/temperature relations used in the process of this invention.

As illustrated in FIGURE 4, too short a period of time of cooling or, conversely, too great a rate of cooling, will result in a dendrite of gallium arsenide 10 forming at $T_F$. On the other hand, too long a time of cooling or, conversely, too low a rate of cooling, will result in the polycrystalline clinker, or chunk 12 or plate 13, at $T_F$. It is apparent, of course, that the invention is not limited to absolute linear cooling as schematically depicted in FIGURE 4 but at the time of formation of the blades 1 the cooling rate should exhibit the time/temperature ratio anticipated from the slope of the curves illustrated herein.

To insure completion of all growth, the bladelike crystals which form at $T_F$ are permitted to dwell within the furnace while the reaction vessel is being cooled slowly toward room temperature. The growth is observed to proceed in a lateral direction in the crystal thus adding substantially to the width dimension of the blades.

In regard to the effect of cooling rate on crystal growth, it is believed that at the elevated temperatures $T_V$ (where V designates the vapor stage) a quantity of vapors of halides, such as the iodide, of Group III and Group V elements, for example, gallium and arsenic, exist throughout the reaction chamber. Upon cooling the reaction chamber, the vapor would appear to be comparable to a supersaturated solution. At some point during slow cooling, a minimal number of nucleation sites will form. With slow cooling the supersaturation can be considered small in magnitude, and upon the formation of the very few nucleation sites slow coalescing of the precipitant (in this case gallium arsenide) and slow growth of polycrystalline chunks or tiny plates of the compound will result. If extremely rapid cooling is occurring, many nucleation sites will form in the same instant, and the growth on each nucleation site will be extremely rapid and comparable to typical whisker-like growth of crystals. On the other hand, the intermediate and controlled cooling procedure employed in this invention results in the formation of a number of nucleation sites with the rate of growth on each site quite rapid but in an orderly fashion with the individual atoms of the Group III and Group V elements lodging themselves in their appropriate lattice sites wherein one of the crystallographic axes of the crystal is preferred over others available during crystal growth, thereby effecting formation of elongated crystal blades in accordance with the invention. The crystallographic evidence indicates that generally a preferred growth takes place upon a twin crystal seed having a coherent (111) twin plane in the <211> direction of the crystal along the length thereof. Thus there are formed crystal blades having a major growth axis in the length thereof which is at least five times that of the secondary growth axis in the width of the crystal and at least fifty times that of the minor growth axis in the thickness of the crystal.

With respect to the concentration of reactants necessary for successful growth on the crystal blades of semiconducting materials, it is apparent that at least an adequate quantity of reactant vapors must be present in the reaction chamber. Under conditions wherein the reaction chamber containing the vapors is cooled uniformly, the concentration of the vapors (which, in turn, determines the pressure of the system) undergoing formation is fixed by the initial concentration of reactants. It is found, as will be described hereinafter in the examples, that the crystal form is sensitive to the initial concentration of the reactants, which should be maintained within prescribed limits. On the other hand, in the embodiment wherein one portion of the tube is cooled at the expense of another portion of the tube, the reactant concentration or pressure within the tube is automatically adjusted in the tube, thus permitting a wider latitude in the range of concentration of the reactants for the formation of the crystal blades. Specifically, a large increase in the concentration of the reactants in the hereinafter following Example I had an unfavorable effect upon the formation of the crystal blades of the present invention whereas a similar increase of reactants in the process as described in Example VI had no effect upon the formation of the blades.

The concentration of the reactants is observed also to affect the temperature at which nucleation of the blades occurs. By increasing the initial concentration of the reactants, it is possible to effect a supersaturation of the vapors to form crystal blades at a relatively higher nucleation temperature. Generally, a nearly linear relationship exists between the charge concentration and the nucleation temperature in degrees centigrade. Accordingly, growth of blades may be effected by maintaining the reactants in the vapor state at a predetermined concentration and thereafter increasing the concentration of the reactants in a predetermined manner to effect a supersaturation of the reactants, thereupon forming the desired crystal blades without cooling.

The following are examples of individual experiments resulting in crystal blades of semiconducting materials employing the procedure of this invention. These examples will further illustrate the scope of the invention whereby the crystal blades may be produced. For example, while a preferred embodiment has been described herein in detail whereby the blades are produced in an evacuated reaction chamber charged only with the reactant materials, the examples which follow will show that other atmospheric conditions, such as an atmosphere of an inert gas, such as helium, hydrogen or argon, may also be used.

*Example I*

A quartz tube, open at one end and having an internal diameter of 18 mm. is charged with 60 mg. of gallium metal, 60 mg. of arsenic and 200 mg. of iodine. The tube is then evacuated to 0.1 micron of mercury pressure and sealed. After sealing, the total reaction chamber volume within the tube is measured at 40 cubic centimeters. The tube is then placed within a furnace of the type illustrated in FIGURE 3 with the entire tube being heated uniformly.

After the insertion of the reaction tube, the furnace is brought to an equilibrium temperature of 1273° K. and maintained for about an hour to insure complete reaction.

During this period of time, the reactants within the chamber are transformed into the vapor state in the desired concentration. After the period of 60 minutes the amount of electrical energy fed to the furnace is reduced to result in cooling of the reaction chamber uniformly at a controlled rate. The rate of cooling is adjusted by current adjustment by appropriate resistance control means, e.g., a Variac, resulting in a rate of cooling of about 15° C. per minute, and in a slope of the curve of degrees Kelvin at the point $T_F$ versus time in minutes, of minus 15. At the end of 4 minutes of such cooling, there is a sudden appearance of a solid phase within the reaction chamber in the form of elongated crystal blades of gallium arsenide. After 15 minutes of dwell within the furnace to insure completion of all growth, the tube is removed from the furnace and allowed to cool to room temperature. The quartz tube is opened, and the blades of gallium arsenide are recovered.

*Example II*

The same type and volume of reaction chamber used in Example I having a diameter of two inches and a volume of 400 cubic centimeters is charged with 0.600 g. of gallium metal, 0.600 g. of arsenic and 2.00 g. of iodine. The tube is then evacuated to 0.1 micron of mercury pressure and sealed. The tube is then placed within a furnace of the type illustrated in FIGURE 3 with the entire tube being heated uniformly.

After the insertion of the reaction tube, the tube is brought to an equilibrium temperature of 1258° K. and maintained thereat for about 2 hours. Current is then decreased to cool the furnace uniformly at 70° C. per minute giving a curve having a slope of minus 70. Again after about 1 minute crystal blades of gallium arsenide are formed and recovered after the system cools.

*Example III*

The same type of reaction chamber used in Example II is charged with 0.600 g. of gallium metal, 0.600 g. of arsenic and 2.00 g. of iodine. The tube is then evacuated to 0.1 micron of mercury pressure and sealed. The tube is then placed within a furnace of the type illustrated in FIGURE 3 with the entire tube being heated uniformly.

After the insertion of the reaction tube, the tube is brought to an equilibrium temperature of 1258° K. and maintained thereat for about 2 hours. Current is then decreased to cool the furnace uniformly at 30° C. per minute giving a curve having a slope of minus 30. Again after about 2 minutes crystal blades of gallium arsenide are formed and recovered after the system cools.

*Example IV*

A quartz tube, open at one end and having an internal diameter of 17 mm. is charged with 0.25 g. of polycrystalline gallium arsenide and 0.22 g. of crystalline iodine. The tube is then evacuated to 0.1 micron of mercury pressure and sealed. After sealing, the total reaction chamber volume within the tube is measured at 69 cubic centimeters. The tube is then placed within a furnace of the type illustrated in FIGURE 3.

Before insertion of the reaction tube, furnace B is brought to an equilibrium temperature of 1270° K. as measured by thermocouples embedded therein and furnace A to 1223° K. The tube is inserted in a manner placing one end of the tube within the furnace B structure and the other end within furnace A. The tube is then maintained in this condition for 60 minutes.

During this period of time, the reactants within the chamber are transformed into the vapor state. After the period of 60 minutes the amount of electrical energy fed to the furnace is reduced to result in cooling of a portion of B of the reaction chamber surrounded by this furnace at a controlled rate. The rate of cooling is adjusted by current adjustment by appropriate resistance control means, e.g., a Variac, resulting in a rate of cooling of about 12° C. per minute, and in a slope of the curve of degrees Kelvin versus time in minutes of minus 12. At the end of 5 minutes of such cooling, there is a sudden appearance of a solid phase within the reaction chamber in the form of crystal blades of gallium arsonide. After 30 minutes of dwell within the furnace to insure completion of growth to the furnace all current is turned off and the assembly is permitted to cool until the tube can be conveniently removed, at which time it is removed, the quartz tube is opened, and the blades of gallium arsenide are recovered.

*Example V*

The same type and volume of reaction chamber used in Example IV was charged with 0.18 g. of gallium arsenide and 0.10 g. of indium arsenide and 0.22 g. of crystalline iodine. After insertion of the tube into the same type of furnace, the tube was brought to an equilibrium temperature of 1205° K. and maintained there for 60 minutes. Again, the reactants were transformed into a vapor state. Current was then decreased in the furnace to cool a portion B of the reaction chamber at a rate of about 13° C. per minute, giving a curve having a slope of minus 13. Again, after about 15 minutes, the crystal blades of gallium (0.7) indium (0.3) arsenide formed and were recovered after the system cooled.

The following Example VI illustrates the formation of crystal blades of Group III–V compounds containing p-type active impurities formed in accordance with this invention.

*Example VI*

The same type of reaction chamber used in Example I having a diameter of two inches and a capacity of 400 cubic centimenters is charged with 0.600 g. of gallium metal, 0.600 g. of arsenic, 2.00 g. of iodine and 20 mg. of zinc metal. The tube is then evacuated to 1 micron of mercury pressure and sealed. After the insertion of the reaction tube, the tube is brought to an equilibrium temperature of 1258° K. and maintained thereat for about 24 hours. Current is then decreased to cool the furnace uniformly at 10° C. per minute giving a curve having a slope of minus 10. Again after about 6 minutes crystal blades of p-type gallium arsenide are formed and recovered after the system cools ($n=7\times10^{18}$ atoms/cc.).

*Example VII*

The same type of reaction chamber as used in Example I having a capacity of 320 cubic centimeters is charged with 480 mg. of gallium metal, 480 mg. of arsenic, 1.8 grams of iodine. The tube is then evacuated to 1 micron mercury pressure and sealed. The evacuated tube is then brought to an equilibrium temperature of 1040° C. and maintained there for 3 hours. Thereupon, the reactants are transformed into the vapor state. Current is then decreased to cool the furnace at the rate of about 1.7° C. per minute. At a nucleation temperature of about 940° C., blades of gallium arsenide are formed.

*Example VIII*

The same type of reaction chamber as used in Example I having a capacity of 320 cubic centimeters is charged with 240 mg. of gallium metal, 240 mg. of arsenic, 0.9 gram of iodine. The tube is then evacuated to ½ micron mercury pressure and sealed. The evacuated tube is then brought to an equilibrium temperature of 1050° C. and maintained there for about 3 hours. Thereupon, the reactants are transformed into the vapor state. Current is then decreased to cool the furnace uniformly at the rate of 1.6% C. per minute. At a nucleation temperature of 890° C., blades of gallium arsenide are formed.

*Example IX*

The same type of reaction chamber as used in Example I having a capacity of 320 cubic centimeters is charged with 480 mg. of gallium metal, 480 mg. of arsenic, and 1.8 grams of iodine. The tube is then evacuated to 1 micron mercury pressure and sealed. The evacuated tube is then brought to an equilibrium temperature of 1070° C. and maintained there for about 3 hours. Thereupon, the reactants are transformed into the vapor state. Current is then decreased to cool the furnace at the rate of about 4° C. per minute. At a nucleation temperature of 965° C., blades of gallium arsenide are formed.

*Example X*

The same type of reaction chamber as used in Example I having a capacity of 300 cubic centimeters is charged with 240 mg. of gallium metal, 144 mg. of arsenic and 800 mg. of iodine. The tube is then flushed with helium and sealed at atmospheric pressure under a helium atmosphere. The tube is then brought to an equilibrium temperature of 1031° C. and maintained there for about 2 hours. Thereupon, the reactants are transformed into the vapor state. Current is then decreased to cool the furnace at the rate of about 7½° C. per minute. At a nucleation temperature of 950° C., blades of gallium arsenide are formed.

*Example XI*

The same type of reaction chamber as used in Example I having a capacity of 300 cubic centimeters is charged with 240 mg. of gallium metal, 144 mg. of arsenic and 800 mg. of iodine. The tube is then flushed with hydrogen and sealed at one-half atmospheric pressure under a hydrogen atmosphere. The tube is then brought to an equilibrium temperature of 1031° C. and maintained there for about 2 hours. Thereupon, the reactants are transformed into the vapor state. Current is then decreased to cool the furnace at the rate of about 7½° C. per minute. At a nucleation temperature of 950° C., blades of gallium arsenide are formed.

*Example XII*

The same type of reaction chamber as used in Example I having a capacity of 300 cubic centimeters is charged with 396 mg. of indium metal, 200 mg. of iodine and 240 mg. of arsenic. The tube is then evacuated to 1 micron mercury pressure and sealed. The evacuated tube is then brought to an equilibrium temperature of 1050° C. and maintained there for about 2 hours. Thereupon, the reactants are transformed into the vapor state. Current is then decreased to cool the furnace at the rate of about 7½° C. per minute. At the end of about 20 minutes the tube is ejected from the furnace and allowed to cool slowly to room temperature. Blades of indium arsenide are formed within the tube.

*Example XIII*

The same type of reaction chamber as used in Example I having a capacity of 320 cubic centimeters is charged with 1.1 grams of germanium and 3.8 grams of iodine. The tube is then evacuated to 1 micron mercury pressure and sealed. The evacuated tube is then brought to an equilibrium temperature of 800° C. and maintained there for about 2 hours. Current is then descreased to cool the furnace at the rate of about 70° C. per minute. At the end of 1 minute blades begin to appear. At the end of about 20 minutes of dwell within the furnace the tube is ejected from the furnace and allowed to cool slowly to room temperature. Blades of germanium are formed and recovered after the system cools.

*Example XIV*

The same type of reaction chamber as used in Example I having a capacity of 300 cubic centimeters is charged with 96 mg. silicon, 800 mg. iodine and 40 mg. carbon. The tube is then evacuated to 1 micron mercury pressure and sealed. The evacuated tube is then brought to an equilibrium temperature of 1300° C. and maintained there for about 1 hour. Thereupon, the reactants are transformed into the vapor state. Current is then decreased to cool the furnace at the rate of about 30° C. per minute. At the end of about 12 minutes blades begin to appear. After about ½ hour the tube is ejected from the furnace and allowed to cool slowly to room temperature. Blades of silicon carbide are formed.

*Example XV*

The same type of reaction chamber as used in Example I having a capacity of 300 cubic centimeters is charged with 240 mg. gallium, 137 mg. phosphorous and 0.2 cc. bromine. The tube is then evacuated to 1 micron mercury pressure and sealed. The evacuated tube is then brought to an equilibrium temperature of 1200° C. and maintained there for about 1½ hours. Current is then decreased to cool the furnace at the rate of about 30° C. per minute. At about 950° the tube is ejected from the furnace and allowed to cool slowly to room temperature. Thereupon, blades of gallium phosphide are formed.

It is apparent from the foregoing that there is provided in the novel products and processes of this invention a method of forming crystal blades of semiconductor materials including germanium and silicon, silicon carbide and Group III–V compounds which may be further fabricated into semiconductor devices in accordance with known techniques. The crystal may be treated in normal fashion for further fabrication. As may be appreciated, it is possible to employ the common diffusion and alloying techniques for incorporating a junction in the crystals formed in accordance with this invention. In subsequent processing of a crystal of this invention, in which thereafter there has been placed a junction, the crystal may be diced, leads may be placed in the wafer in a conventional manner and the semiconductor housed in accordance with known procedures, to thereby result in a semiconductor device.

It will be appreciated that the foregoing description of this invention is detailed for the purposes of illustration but that the invention should not be considered limited to such detail and the scope of the invention should be construed only in accordance with the appended claims.

What we claim is:

1. The method of forming bladelike crystals of semiconductor material of the general formula $$(A_xB_{1-x})^{III}(C_yD_{1-y})^{V}$$

where A and B are gallium and indium, respectively, and C and D are arsenic and phosphorus, respectively, and where subscripts $x$ and $y$ denote atom proportions whose values are zero to one, inclusive, said method comprising:

(a) charging a reactor chamber with a halogen and a member selected from the group consisting of (i) the semiconductor material itself and (ii) the elements for making the semiconductor material;
(b) heating the ingredients charged into the reaction chamber to a temperature adequate to transform said ingredients to the vapor phase in said chamber; and
(c) cooling at least a portion of said reaction chamber at a rate by which the slope of the curve of temperature in degrees Kelvin versus time in minutes, at the point where crystallization occurs, is within the range of approximately minus 1 to minus 70, to thereby form bladelike crystals of said material within said reaction chamber.

2. The method of forming bladelike crystals of semiconductor materials of the Group III–V elements, said materials being selected from the group consisting of gallium, indium, arsenic and phosphorus, said method comprising:

(a) charging a reaction chamber with iodine and a member selected from the group consisting of (i) the III–V semiconductor material itself and (ii) the appropriate ingredients for making the III–V semiconductor material, in the appropriate proportions;
(b) heating the ingredients charged into the reaction chamber to a temperature adequate to transform said ingredients to the vapor phase in said chamber; and
(c) cooling at least a portion of said reaction chamber at a rate by which the slope of the curve of temperature in degrees Kelvin versus time in minutes, at the point where crystallization occurs, is within the range of approximately minus 1 to minus 70, to thereby form bladelike crystals of said material within said reaction chamber.

3. The method set forth in claim 2 in which said cooling rate is from minus 15 to minus 50.

4. The method set forth in claim 1 in which the halogen is iodine.

5. The method set forth in claim 1 in which the bladelike crystals produced have a length at least five times their width and at least fifty times their thickness and are twin crystals having [111] exterior faces.

6. The method of forming bladelike crystals of gallium arsenide, comprising:

(a) charging a reaction chamber with a halogen and a member selected from the group consisting of (i) gallium arsenide itself and (ii) gallium and arsenic in the appropriate proportions;
(b) heating the ingredients charged into the reaction chamber to a temperature adequate to transform said ingredients to the vapor phase in said chamber; and
(c) cooling at least a portion of said reaction chamber at a rate by which the slope of the curve of temperature in degrees Kelvin versus time in minutes, at the point where crystallization occurs, is whether the range of approximately minus 1 to minus 70, to thereby form bladelike crystals of gallium arsenide within said chamber.

7. The method set forth in claim 6 in which the halogen is iodine.

8. The method set forth in claim 7 in which said cooling rate is approximately minus 12.

9. The method of forming bladelike crystals of indium arsenide, comprising:

(a) charging a reaction chamber with a halogen and a member selected from the group consisting of (i) indium arsenide itself and (ii) indium and arsenic in the appropriate proportions;

(b) heating the ingredients charged into the reaction chamber to a temperature adequate to transform said ingredients to the vapor phase in said chamber; and (c) cooling at least a portion of said reaction chamber at a rate by which the slope of the curve of temperature in degrees Kelvin versus time in minutes, at the point where crystallization occurs, is within the range of approximately minus 5 to minus 15, to thereby form bladelike crystals of indium arsenide within said chamber.

10. The method of forming bladelike crystals of gallium phosphide, comprising:

(a) charging a reaction chamber with a halogen and a member selected from the group consisting of (i) gallium phosphide itself and (ii) gallium and phosphorus in the appropriate proportions;

(b) heating the ingredients charged into the reaction chamber to a temperature adequate to transform said ingredients to the vapor phase in said chamber; and (c) cooling at least a portion of said reaction chamber at a rate by which the slope of the curve of temperature in degrees Kelvin versus time in minutes, at the point where crystallization occurs, is within the range of approximately minus 15 to minus 50, to thereby form bladelike crystals of gallium phosphide within said chamber.

11. The method of forming bladelike crystals of gallium$_{(1-x)}$ indium$_{(x)}$ arsenide, where subscript $x$ denotes an atom proportion whose value is greater than zero but less than one, said method comprising:

(a) charging a reaction chamber with a halogen and a member selected from the group consisting of (i) gallium$_{(1-x)}$ indium$_{(x)}$ arsenide itself and (ii) gallium, indium and arsenic in the appropriate proportions;

(b) heating the ingredients charged into the reaction chamber to a temperature adequate to transform said ingredients to the vapor phase in said chamber; and (c) cooling at least a portion of said reaction chamber at a rate by which the slope of the curve of temperature in degrees Kelvin versus time in minutes, at the point where crystallization occurs, is within the range of approximately minus 5 to minus 30, to thereby form bladelike crystals of gallium$_{(1-x)}$ indium$_{(x)}$ arsenide within said chamber.

References Cited by the Examiner

UNITED STATES PATENTS

| | | | |
|---|---|---|---|
| 2,677,627 | 5/54 | Montgomery et al. | 117—106 |
| 2,692,839 | 10/54 | Christensen et al. | 148—175 |
| 2,763,581 | 9/56 | Freedman | 148—175 |
| 2,813,811 | 11/57 | Sears | 148—1.6 |
| 2,878,152 | 3/59 | Runyan et al. | 148—33.5 |
| 3,025,192 | 3/62 | Lowe | 148—33 |
| 3,031,403 | 4/62 | Bennett | 148—1.6 |
| 3,033,714 | 5/62 | Ezaki et al. | 148—33 |

OTHER REFERENCES

Antel et al.: Article in Journal of the Electrochemical Society, vol. 106, June 1959, pages 509–510.

Growth and Perfection of Crystals, Proceedings of an International Conference on Crystal Growth held at Cooperstown, New York, August 27–29, 1958, pages 49–54.

Loonam: Principles and Applications of the Iodine Process, Journal of the Electrochemical Society, March 1959, pages 238–244.

Minden: Letter entitled "Leaves of GaAS," Journal of Applied Physics, vol. 33, pages 243–244, January 1962.

"Vapor Reaction Makes Gallium Phosphide," Chemical and Engineering News, Apr. 18, 1960, page 72.

DAVID L. RECK, *Primary Examiner.*